US009776281B2

United States Patent
Djebara et al.

(10) Patent No.: US 9,776,281 B2
(45) Date of Patent: Oct. 3, 2017

(54) NOTCHED LEAD WIRE FOR A SOLID ELECTROLYTIC CAPACITOR

(75) Inventors: Lotfi Djebara, Paris (FR); Stanislav Zednicek, Lanskroun (CZ); Jiri Snitil, Lanskroun (CZ); Jiri Navratil, Veseli nad Moravou (CZ); Ludek Kubes, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 73 days.

(21) Appl. No.: 13/483,299

(22) Filed: May 30, 2012

(65) Prior Publication Data

US 2013/0321985 A1    Dec. 5, 2013

(51) Int. Cl.
| | |
|---|---|
| *H01G 9/00* | (2006.01) |
| *H01G 9/04* | (2006.01) |
| *H01G 9/145* | (2006.01) |
| *H01G 4/228* | (2006.01) |
| *B23K 26/28* | (2014.01) |
| *H01G 9/012* | (2006.01) |
| *B23K 26/32* | (2014.01) |
| *B23K 26/0622* | (2014.01) |
| *H01G 9/052* | (2006.01) |

(Continued)

(52) U.S. Cl.
CPC .......... *B23K 26/28* (2013.01); *B23K 26/0622* (2015.10); *B23K 26/32* (2013.01); *H01G 9/012* (2013.01); *B23K 2201/38* (2013.01); *B23K 2203/50* (2015.10); *H01G 9/052* (2013.01); *H01G 9/15* (2013.01)

(58) Field of Classification Search
CPC .......... H01G 9/15; H01G 9/042; H01G 9/012
USPC ................. 361/528, 533, 508, 523
See application file for complete search history.

(56) References Cited

U.S. PATENT DOCUMENTS

| 3,345,545 A | 10/1967 | Bourgault et al. |
| 3,612,957 A | 10/1971 | Steigerwald |

(Continued)

FOREIGN PATENT DOCUMENTS

| JP | 0 722289 A | 1/1995 |
| JP | 2003142339 A * | 5/2003 |

(Continued)

OTHER PUBLICATIONS

Abstract of Japanese Patent—JPH088143, Jan. 12, 1996, 2 pages.

(Continued)

*Primary Examiner* — Eric Thomas
*Assistant Examiner* — Arun Ramaswamy
(74) *Attorney, Agent, or Firm* — Dority & Manning, P.A.

(57) ABSTRACT

A capacitor containing a solid electrolytic capacitor element including a sintered porous anode body and a relatively large diameter anode lead wire is provided. The lead wire is electrically connected to the anode body for connection to an anode termination. Further, the lead wire has a diameter that is at least about 10% of the height of the porous anode body to improve the points of contact between the anode body and wire to reduce ESR. A portion of the lead wire extends from a surface of the anode body in a longitudinal direction. At least one notch can be formed in the portion of the lead wire that extends from the anode body. The notch can be formed via a laser or by cutting, punching, or sawing and can serve as the point of electrical connection between the anode termination and the lead wire.

19 Claims, 3 Drawing Sheets

(51) Int. Cl.
   *B23K 101/38* (2006.01)
   *H01G 9/15* (2006.01)
   *B23K 103/00* (2006.01)

(56) References Cited

U.S. PATENT DOCUMENTS

| | | |
|---|---|---|
| 4,097,916 A | 6/1978 | Piper |
| 4,330,929 A | 5/1982 | Cripe |
| 4,409,642 A | 10/1983 | Edson |
| 4,945,452 A | 7/1990 | Sturmer et al. |
| 5,111,327 A | 5/1992 | Blohm et al. |
| 5,457,862 A | 10/1995 | Sakata et al. |
| 5,469,326 A | 11/1995 | Kanetake |
| 5,473,503 A | 12/1995 | Sakata et al. |
| 5,729,428 A | 3/1998 | Sakata et al. |
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,322,912 B1 | 11/2001 | Fife |
| 6,391,275 B1 | 5/2002 | Fife |
| 6,416,730 B1 | 7/2002 | Fife |
| 6,447,570 B1 | 9/2002 | Pozdeev-Freeman |
| 6,527,937 B2 | 3/2003 | Fife |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,665,172 B1 | 12/2003 | Kim et al. |
| 6,674,635 B1 | 1/2004 | Fife et al. |
| 6,987,663 B2 | 1/2006 | Merker et al. |
| 7,072,171 B1 | 7/2006 | Muffoletto et al. |
| 7,116,548 B2 | 10/2006 | Satterfield, Jr. et al. |
| 7,154,742 B1 | 12/2006 | Hahn et al. |
| 7,220,397 B2 | 5/2007 | Kimmel et al. |
| 7,262,511 B2 | 8/2007 | Osako et al. |
| 7,341,705 B2 | 3/2008 | Schnitter |
| 7,342,775 B2 | 3/2008 | Hahn et al. |
| 7,359,181 B2 * | 4/2008 | Kuriyama ............ 361/540 |
| 7,381,396 B2 | 6/2008 | Thomas et al. |
| 7,419,926 B2 | 9/2008 | Schnitter et al. |
| 7,515,396 B2 | 4/2009 | Biler |
| 7,594,937 B2 | 9/2009 | Amita et al. |
| 7,646,589 B2 | 1/2010 | Kuriyama |
| 7,787,235 B2 | 8/2010 | Fujita et al. |
| 7,929,274 B2 | 4/2011 | Reed et al. |
| 8,066,783 B2 | 11/2011 | Takeda |
| 8,125,769 B2 | 2/2012 | Djebara |
| 8,313,538 B2 | 11/2012 | Merker et al. |
| 8,482,902 B2 | 7/2013 | Ishida et al. |
| 2004/0136144 A1 | 7/2004 | Hirota et al. |
| 2005/0237698 A1 | 10/2005 | Postage et al. |
| 2007/0253147 A1* | 11/2007 | Marek et al. ............ 361/528 |
| 2009/0080144 A1* | 3/2009 | Matumoto et al. ...... 361/528 |
| 2009/0103243 A1 | 4/2009 | Mizukoshi et al. |
| 2009/0237867 A1 | 9/2009 | Kurokawa |
| 2009/0279232 A1 | 11/2009 | Druding et al. |
| 2010/0079930 A1 | 4/2010 | Hayashi et al. |
| 2011/0085285 A1 | 4/2011 | Zednicek et al. |
| 2011/0149476 A1 | 6/2011 | Saida et al. |

FOREIGN PATENT DOCUMENTS

| | | |
|---|---|---|
| JP | 2003 229327 A | 8/2003 |
| JP | 2006 295075 A | 10/2006 |
| JP | 2008305824 A * | 12/2008 |
| WO | WO 98 49356 A1 | 11/1998 |
| WO | WO 2005 106905 A1 | 11/2005 |
| WO | WO 2006/057455 A1 | 6/2006 |

OTHER PUBLICATIONS

Abstract of Japanese Patent—JP2000012387, Jan. 14, 2000, 2 pages.
Abstract of Japanese Patent—JP2008305824 dated Dec. 18, 2008, 2 pages.
Abstract of Japanese Patent—JP2009266931 dated Nov. 12, 2009, 2 pages.
Search Report for GB1309411.5 dated Aug. 29, 2013, 4 pages.
Hintz et al., "Anode Lead Wire Pre-Treatments for Improved Lead Wire Bonding in Tantalum Capacitor Anodes Processed by De-Oxidation/Sintering," Carts USA, Mar. 15-18, 2010, New Orleans, Louisiana, 13 pages.
Vasina et al., "Failure Modes of Tantalum Capacitors Made by Different Technologies," Carts USA, Mar./Apr. 2001, 6 pages.
Related U.S. Patent Application Form.
Abstract of Japanese Patent—JPS5718317 A, Jan. 30, 1982, 1 page.
Abstract of Japanese Patent—JP2004253501 A, Sep. 9, 2004, 1 page.
Abstract of Japanese Patent—JP2004281619 A, Oct. 7, 2004, 1 page.
Abstract of Japanese Patent—JP2005033097 A, Feb. 3, 2005, 2 pages.
Abstract of Japanese Patent—JP2008187091 A1, Aug. 14, 2008, 2 pages.
Abstract of Japanese Patent—JP2001057319 A, Feb. 27, 2001, 2 pages.
Abstract of Japanese Patent—JP2001217160 A, Aug. 10, 2001, 2 pages.
Abstract of Japanese Patent—JP2001307957 A, Nov. 2, 2001, 2 pages.
Abstract of Japanese Patent—JP2003332173 A, Nov. 21, 2003, 2 pages.
Hahn et al., "Strategies for Manufacturing Ultra Low ESR Ta Capacitors,"Carts USA, Mar. 21-24, 2005, Palm Springs, California, 7 pages.
Abstract of Japanese Patent—JPH03196511A, Aug. 28, 1991, 1 page.
Abstract of Japanese Patent—JP2003217974A, Jul. 31, 2003, 2 pages.
Abstract of Japanese Patent—JP2004349725A, Dec. 9, 2004, 2 pages.
Abstract of Japanese Patent—JP2011071151A, Apr. 7, 2011, 1 page.

* cited by examiner

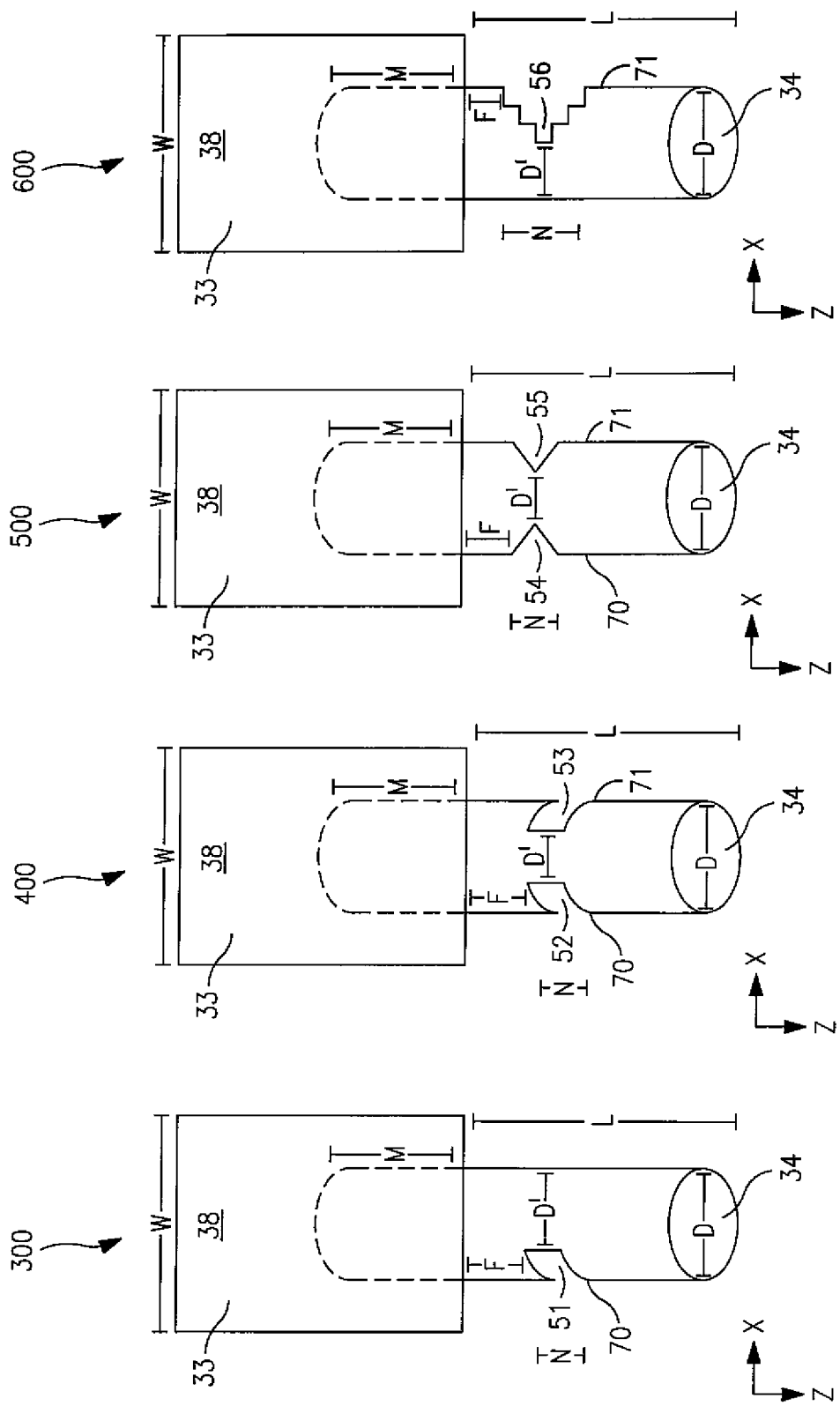

NOTCHED LEAD WIRE FOR A SOLID ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with a lead wire extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the lead wire. In fact, it can be difficult to find many points of contact between the lead wire and the powder particles. When the contact area between the anode body and the wire is decreased, there is a corresponding increase in resistance where the wire and the anode meet. This increased equivalent series resistance (ESR) results in a capacitor exhibiting decreased electrical capabilities.

While several efforts have been made to improve the connection between the anode body and anode lead wire, these efforts involve additional processing steps that can be disadvantageous from a manufacturing standpoint. As such, a need currently exists for an improved solid electrolytic capacitor having increased points of contact between the anode body and the lead wire, thereby significantly improving electrical capabilities by achieving ultralow ESR levels.

SUMMARY OF THE INVENTION

In accordance with one embodiment of the present invention, a solid electrolytic capacitor is disclosed that comprises a capacitor element. The capacitor element comprises a sintered, porous anode body having a width and a height, an anode lead wire having a thickness that is at least about 10% of the height of the porous anode body, a dielectric layer overlying the sintered porous anode body, and a cathode overlying the dielectric layer that includes a solid electrolyte. Further, the anode lead wire has a first portion positioned within the anode body and a second portion extending from a surface of the anode body in a longitudinal direction. The second portion has a notched region wherein at least one notch is located.

In accordance with another embodiment of the present invention, a method for forming a solid electrolytic capacitor comprising a sintered, porous anode body having a width and a height is disclosed. The method comprises positioning a first portion of an anode lead wire having a thickness that is at least about 10% of the height of the porous anode body within a powder formed from a valve metal composition such that a second portion of the anode lead wire extends from a surface of the anode body in a longitudinal direction. The method further comprises compacting the powder around the first portion of the anode lead wire, sintering the compacted powder and the first portion of the anode lead wire to form the porous anode body, forming a notched region in the second portion of the anode lead wire wherein at least one notch is located, and welding the anode lead wire to an anode termination at the notched region to form an electrical connection between the anode lead wire and the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 3 is a top-view of one embodiment of the electrolytic capacitor of the present invention;

FIG. 4 is a top view of another embodiment of the electrolytic capacitor of the present invention;

FIG. 5 is a top view of still another embodiment of the electrolytic capacitor of the present invention;

FIG. 6 is a top view of yet another embodiment of the electrolytic capacitor of the present invention;

Figure 1:
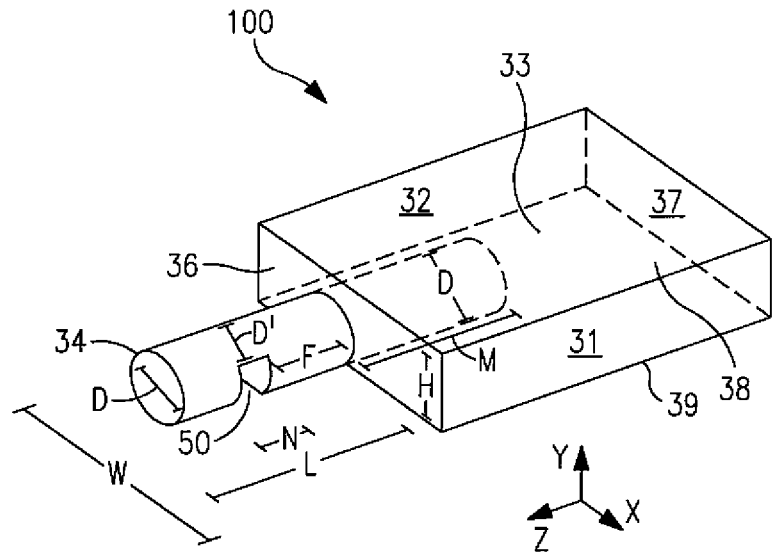
FIG. 1 is a perspective view of one embodiment of the electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. An anode lead wire can be electrically connected to the anode body for connection to an anode termination. The anode lead wire can have a relatively large thickness (e.g., diameter) to improve the points of contact between the porous anode body and the wire, thus reducing the capacitor's ESR. For example, the thickness of the anode lead wire can be from about 10% to about 95% of the height of the porous anode body. In other embodiments, the thickness of the anode lead wire can be from about 20% to about 90% of the height of the porous anode body, and in still other embodiments, the thickness of the anode lead wire can be from about 30% to about 85% of the height of the porous anode body. Further, the thickness of the anode lead wire can be from about 5% to about 65% of the width of the porous anode body. In other embodiments, the thickness of the lead wire can be from about 10% to 60% of the width of the porous anode body, and in still other embodiments, the thickness of the anode lead wire can be from about 15% to 55% of the width of the porous anode body.

A portion of the anode lead wire can be positioned within the anode body and a portion of the anode lead wire can extend from a surface thereof in a longitudinal direction. At least one notch can be formed in the portion of the anode lead wire extending from a surface of the anode body. The anode lead wire can be electrically connected to an anode termination, or lead frame, while the cathode can be electrically connected to a cathode termination by any technique generally known in the art. Regardless of the technique used, the connection between the anode lead wire and the anode termination can be formed at the notched region of the wire. Moreover, the notch can be positioned anywhere along the portion of the anode lead wire extending from the surface of the anode body, so long as there is a sufficient distance between the surface and the notch so that the connection can be made without damaging the capacitor. Further, the presence of the notch on the lead wire allows for a decrease in the amount of energy required to form an electrical connection between the anode lead wire and the anode termination. Various embodiments of the solid electrolytic capacitor of the present invention are discussed in more detail below.

Referring now to FIG. 1, one particular embodiment of a capacitor element 100 that is formed from a porous anode body 33 and an anode lead wire 34 is shown. Generally, FIG. 1 is a perspective view of the porous anode body 33 that is formed around anode lead wire 34 and shows the dimensions of the porous anode body 33 and the anode lead wire 34. For instance, the porous anode body 33 can have a first side surface 31, a second side surface 32, a front surface 36, a rear surface 37, an upper surface 38, and a lower surface 39. The porous anode body 33 can also have a width W that can refer, for example, to the width of the front surface 36, and a height H that can refer, for example, to the height or thickness of the front surface 36. The width W of the front surface 36 of the porous anode body 33 can range from about 400 micrometers to about 6000 micrometers, in some embodiments, from about 800 micrometers to 4500 micrometers, and in some embodiments, from about 1200 micrometers to about 3000 micrometers. Additionally, the height H of the front surface 36 of the porous anode body 33 can range from about 200 micrometers to about 4000 micrometers, in some embodiments from about 400 micrometers to about 3000 micrometers, and in some embodiments from about 600 micrometers to about 2000 micrometers.

In the particular embodiment shown in FIG. 1, the porous anode body 33 is in the shape of a rectangular pellet. In addition to having a rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Further, although FIG. 1 shows that the anode lead wire 34 is circular in shape having a thickness D, the anode lead wire 34 disclosed herein may possess any desired cross-sectional shape, such as elliptical, square, rectangular, etc. As shown in FIG. 1, the anode lead wire 34 can have a first portion M that is positioned within the anode body 33 and a second portion L that extends from a surface of the porous anode body 33, such as front surface 36. The thickness of the anode lead wire 34 may vary depending on the overall size of the anode body 33. In any event, the larger the thickness D, the larger the number of points of contact between the porous anode body 33 and the anode lead wire 34 along first portion M, which results in a lower ESR and improved electrical capabilities of the capacitor.

As shown in FIG. 1, the anode lead wire 34 extends from the front surface 36 of the porous anode body 33; however, it should be understood that the anode lead wire 34 may also extend from any other surface of the porous anode body 33. Further, the second portion L of anode lead wire 34 that extends from a surface of the porous anode body 33 can have a thickness D, which, as mentioned above, also refers to the thickness of the first portion M of the anode lead wire 34 that is positioned within the porous anode body 33. The size of the anode lead wire 34 may vary depending on the overall size of the anode body 33.

As shown in FIG. 1, the thickness D of the anode lead wire 34 can be uniform along the first portion M and the second portion L, except that at least one notch 50 can be present on the anode lead wire 34 at notch region N along the second portion L. The at least one notch 50 can be rectangular, square, circular, elliptical, triangular, stepped, U-shaped, V-shaped, or any other suitable shape. Because of the notch 50, the anode lead wire 34 has a smaller thickness D' along the notch region N of the anode lead wire 34.

As discussed above, the anode lead wire 34 has a thickness D along the first portion M and second portion L. The thickness D is uniform throughout the anode lead wire except at notch region N, which has a thickness D'. The thickness D can be at least about 10% of the height H of the front surface 36 of the porous anode body 33. For example, the thickness D can generally be from about 10% to about 95% of the height H of the front surface 36 of the porous anode body 33. Further, the thickness ID can be from about 5% to about 65% of the width W of the front surface 36 of the porous anode body 33. For instance, the thickness ID can range from about 20 micrometers to about 3800 micrometers, in some embodiments from about 40 micrometers to about 2850 micrometers, and in some embodiments from about 60 micrometers to about 1900 micrometers. In still other embodiments, the thickness D can be from about 20% to about 90% of the height H of the front surface 36 of the porous anode body 33, such as from about 30% to about 85% of the height H of the front surface 36 of the porous anode body 33. Moreover, in still other embodiments, the thickness D can be from about 10% to about 60% of the width W of the front surface 36 of the porous anode body, such as from about 15% to about 55% of the width W of the front surface 36 of the porous anode body 33.

Meanwhile, the thickness D' of the notch region N of the anode lead wire 34 is smaller than the thickness D of the anode lead wire 34 due to the removal of material from the anode lead wire 34 along the notch region N to form at least one notch 50. The thickness D' of the notch region N is generally from about 20% to 90% of the first diameter D of the anode lead wire 34. For example, the thickness of the notch region D' can range from about 4 micrometers to about 3425 micrometers, in some embodiments from about 8 micrometers to about 2600 micrometers, and in some embodiments from about 12 micrometers to about 1700 micrometers. In other embodiments, the thickness of the notch region D' can be from about 30% to about 80% of the thickness D, such as from about 40% to about 70% of the thickness D.

Figure 2:
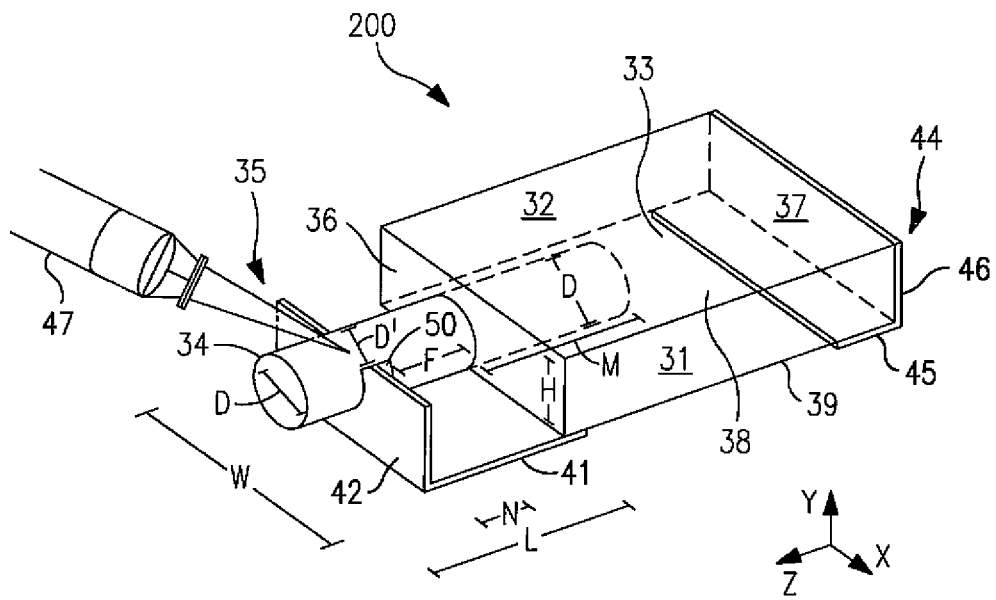
FIG. 2 is a perspective view of another embodiment of the electrolytic capacitor of the present invention.

Referring now to FIGS. 1 and 2, the notch region N can be located anywhere along the second portion L of the anode lead wire 34 (i.e., along the Z-axis) so long as the notch region N is located a sufficient distance F away from the porous anode body 33 such that the capacitor is not damaged when the anode lead wire 34 is welded to an anode termination 35, as is discussed in more detail below. Generally, the ratio of the length of the second portion L to the distance F where the notch 50 is located can be in some embodiments from about 1.1 to about 20, in other embodiments from about 1.5 to about 15, and in still other embodiments from about 2 to about 10. For instance, in one embodiment, the second portion L can have a length that is from about 200 micrometers to about 50 millimeters, in some embodiments from about 400 micrometers to about 30 millimeters, and in some embodiments from about 1000 micrometers to about 10 millimeters. Thus, the distance F to the notch 50 can be from about 10 micrometers to about 45 millimeters when the second portion L has a length that is from about 200 micrometers to about 50 millimeters. Meanwhile, the distance F to the notch 50 can be from about 20 micrometers to about 27 millimeters when the second portion L has a length that is from about 400 micrometers to about 30 millimeters. Further, the distance F to the notch 50 can be from about 50 micrometers to about 9 millimeters when the second portion L has a length that is from about 1000 micrometers to about 10 millimeters.

The notch region N (i.e., the length of the notch 50) can have a length that is from about 10% to about 90% of the second portion L of the anode lead wire 34, which refers to the entire distance that the anode lead wire 34 extends from the front surface 36 of the porous anode body 33. As discussed above, in one embodiment, the second portion L can be from about 200 micrometers to about 50 millimeters, in some embodiments from about 400 micrometers to about 30 millimeters, and in some embodiments from about 1000 micrometers to about 10 millimeters. Hence, the notch region N can have a length of from about 20 micrometers to about 45 millimeters, in some embodiments, from about 40 micrometers to about 27 millimeters, and in some embodiments, from about 100 micrometers to about 9 millimeters.

Moreover, the at least one notch 50 itself can be oriented at various locations around the center point of the anode lead wire 34. For instance, the notch 50 can be oriented along the X-axis or the Y-axis, or at any location in between. In the embodiments shown in FIGS. 1 and 2, for instance, the notch is oriented along the X-axis, although other possible orientations for the at least one notch are discussed in more detail in reference to FIGS. 3-10 below.

Further, as is discussed in more detail below in reference to FIGS. 4-5 and 8-9, there can be more than one notch formed at notch region N. For instance, two notches can be formed at various locations around the center point of the anode lead wire. In one particular embodiment, one notch can be formed on an X-axis facing surface 70 of the anode lead wire 34, and another notch can be formed on an opposing X-axis facing surface 71 of the anode lead wire 34. In another embodiment, one notch can be formed on a Y-axis facing surface 72 of the anode lead wire 34, and another notch can be formed on an opposing Y-axis facing surface 73 of the anode lead wire 34. Regardless of where the two notches are formed on the anode lead wire, the notches can be symmetrical about the center point of the wire.

Regardless of the manner in which the one or more notches are oriented around a center point of the anode lead wire 34, as shown in FIGS. 1 and 2, the presence of the at least one notch 50 results in a reduction of the thickness D of the anode lead wire 34 to a smaller thickness D' at notch region N, which is where welding of the anode lead wire 34 to an anode termination 35 (as shown in FIG. 2) can occur. Due to removal of material at notch region N, the density of the anode lead wire 34 is less at the notch region N as compared to the remainder of the second portion L of the anode lead wire 34 that extends from the front surface 36 of porous anode body 33.

Referring again to FIG. 1, regardless of its geometry or orientation around the center point of the anode lead wire 34, the at least one notch 50 is formed by removal of material at notch region N of the anode lead wire 34. The material can be removed from the anode lead wire 34 to form the notch 50 by cutting, punching, or sawing. Any technique known to one of ordinary skill in the art can be used. For instance, to cut away material from the anode lead wire 34 to form a notch 50, a cutting tool can be used. On the other hand, the notch 50 can be formed via a punching tool. The punching tool construction can offer high accuracy with minimalization of pre-settings. The special designed punches can be made typically from tungsten carbide, hardened steels or derivatives. A common Brinell hardness value for punching materials can be within the range of from about 1,500 $MN/m^2$ to about 1,900 $MN/m^2$, which can be compared to the hardness value of the sintered tantalum material, which can be 500 $MN/m^2$, for example.

The notch can also be formed by a saw that, for instance, utilizes strong diamond blades for precise shape and depth control. The special designed blades can be made from hardened resin coated diamond grit (75%). The thickness of the blades can be within the range of from about 50 micrometers to about 1,500 micrometers. Meanwhile, the size of diamond grit can be within the range from about 80 micrometers to about 1,200 micrometers.

The material can also be removed by a laser to form the notch 50. For instance, a laser can be used on scan mode to carry out erosion of the anode lead wire at the notch region N. For instance, the erosion caused by the laser treatment can create a rough surface, such as the stepped notch shown in FIGS. 6 and 10, which can facilitate laser welding of the anode lead wire 34 to the anode termination 35. The notch can be formed by a single laser shot where each pulse can last for about 0.2 milliseconds to about 20 milliseconds at a spot diameter of from about 0.1 millimeters to about 0.3 millimeters. The notch can also be formed by multiple laser shots where each laser pulse can last for about 0.2 milliseconds to about 0.5 milliseconds (for each pulse) at a spot diameter of from about 0.1 millimeters to about 0.3 millimeters. The typical working area can be about 1.0 millimeters in length and about 0.5 millimeters in width.

Regardless of the particular design or manner in which the capacitor is formed, it can be connected to terminations as is well known in the art. For example, anode and cathode terminations may be electrically connected to the anode wire(s) and the cathode, respectively. The specific configuration of the terminations may vary as is well known in the art. Although not required, in one embodiment, as shown in FIG. 2, for example, the cathode termination 44 can contain a planar portion 45 in electrical contact with a lower surface 39 of the capacitor element and an upstanding portion 46 positioned substantially perpendicular to the planar portion 45 and in electrical contact with a rear surface 38 of the capacitor element. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Referring again to FIG. 2, although not required, the anode termination 35 may likewise contain a planar portion 41 and an upstanding portion 42. The upstanding portion 42 may contain a region that carries the anode lead wire 34 of the present invention. For example, the region may possess a slot for receiving the anode lead wire 34. The slot may have any desired shape, and can be U-shaped, V-shaped, circular, rectangular, square, stepped, etc. for further enhancing surface contact and mechanical stability of the anode lead wire 34 at the notch region N. For instance, the geometry of the slot may match the geometry of the notch 50. After the at least one notch has been formed in the anode lead wire, the anode lead wire 34 can then be electrically connected to the anode termination 35. Any technique may be used to connect the read wire 34 to the anode termination 35, such as by laser welding, by resistance welding, or the use of conductive adhesives, etc. Regardless of the particular welding technique used connect the anode lead wire 34 to the anode termination 35, the amount of energy required to form a sufficient weld is reduced because of the notch 50. Because of the notch 50, there is less material at the notch region N along the lead wire 34, so welding at this region requires less energy than if welding were to occur at a point along the second portion L of the anode lead wire having a thickness D. The smaller thickness D' at notch region N created by the formation of notch 50 means that less anode lead wire material must be heated to create a sufficient spot weld between the anode lead wire 34 and the anode termination 35. Thus, by forming at least one notch 50 in an anode lead wire 34, a relatively thick anode lead wire can still be used to create improved contact with the porous anode body to reduce ESR, yet the welding process to form an electrical connection with an anode termination can still be carried out in an efficient and cost-effective manner due to the reduced thickness of the anode lead wire at the notch. Although the anode lead wire 34 can be welded to the anode termination 35 by any technique generally known to one of skill in the art, FIG. 2 shows the anode lead wire 34 being welded to the anode termination 35 at an upstanding portion 42 of the anode termination 35 via a laser 47.

Any laser welding technique can be utilized, such as the technique described in U.S. Patent Application Publication No. 2010/0072179 to Dvorak, et al., which is incorporated herein in its entirety by reference thereto for all purposes. For instance, laser welding an anode lead wire to an anode termination can involve directing a laser beam through one or more refraction elements before it contacts the lead wire and anode termination. By selectively controlling the index of refraction and thickness of the refraction element, the angle at which the refraction element is positioned relative to the laser beam, etc., the laser beam may be directed to a precise weld location, such as at the notch 50 positioned a sufficient distance F away from the porous anode body, without substantially contacting and damaging other parts of the capacitor, including the porous anode body.

When a laser is also used to form the notch 50 via removing material from the anode lead wire 34, the amount of energy used to form the notch 50 and then sequentially create the weld at the anode termination 35 are different. Generally, the energy required to form a notch is from about 6 Joules to about 16 Joules, while the energy required to weld the anode lead wire to the anode termination is from about 6 Joules to about 26 Joules in the case of a single laser shot.

Further, once the capacitor element is formed and is attached to the terminations as discussed above, it can be enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 0.1 to about 2.5 millimeters, and in some embodiments, from about 0.15 to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

Turning now to FIGS. 3-10, various embodiments of possible notch geometries are discussed in more detail below. Referring now to FIG. 3, a top view of a capacitor element 300 having an anode lead wire 34 is shown. A square-shaped notch 51 is formed at notch region N. The notch 51 is present on an X-axis facing surface 70 of the anode lead wire 34. The notch is located at a distance F away from the porous anode body 33 along second portion L of anode lead wire 34. Because of removal of material from the anode lead wire 34 to form the square-shaped notch 51, the material density of the anode lead wire 34 at the notch region N is less than the material density of the anode lead wire 34 along the remainder of the second portion L of the anode lead wire 34. Additionally, the thickness D' of the anode lead wire 34 at the notch 51 is less than the thickness D of the remainder of the anode lead wire 34.

Another embodiment of a top view of a capacitor element 400 is shown in FIG. 4. Two rectangular-shaped notches 52 and 53 are formed at notch region N. Notch 52 is present on an X-axis facing surface 70 and notch 53 is present on an opposing X-axis facing surface 71 of the anode lead wire 34 such that the anode lead wire is symmetrical at the notch region N. The notches are located at a distance F away from the porous anode body 33 along second portion L of anode lead wire 34. Again, because of removal of material from the anode lead wire 34 to form the rectangular-shaped notches 52 and 53, the material density of the anode lead wire 34 at the notch region N is less than the material density of the anode lead wire 34 along the remainder of the second portion L of the anode lead wire 34. Additionally, the thickness D' of the anode lead wire 34 at notches 52 and 53 is less than the thickness D of the remainder of the anode lead wire 34.

Yet another embodiment of a top view of a capacitor element 500 is shown in FIG. 5. Two triangular-shaped notches 54 and 55 are formed at notch region N. Notch 54 is present on an X-axis facing surface 70 and notch 55 is present on an opposing X-axis facing surface 71 of the anode lead wire 34 such that the anode lead wire is symmetrical at the notch region N. The notches are located at a distance F away from the porous anode body 33 along second portion L of the anode lead wire 34. Once again, because of removal of material from the anode lead wire 34 to form the triangular-shaped notches 54 and 55, the material density of the anode lead wire 34 at the notch region N is less than the material density of the anode lead wire 34 along the remainder of the second portion L of the anode lead wire 34. Further, the thickness D' of the anode lead wire 34 at notches 54 and 55 is less than the thickness D of the remainder of the anode lead wire 34. In FIG. 5, the triangular-shaped notches 54 and 55 result in a non-uniform thickness D' at the notch region N, and thus, D' as described in FIG. 5 refers to the smallest thickness of the anode lead wire 34 at the notch region N.

Still another embodiment of a top view of a capacitor element 600 is shown in FIG. 6. A stepped-shaped notch 56 is formed at notch region N. Notch 56 is present on an X-axis facing surface 71 of the anode lead wire 34. The notch is located at a distance F away from the porous anode body 33 along second portion L of the anode lead wire 34. Once again, because of removal of material from the anode lead wire 34 to form the stepped-shaped notch 56, the material density of the anode lead wire 34 at the notch region N is less than the material density of the anode lead wire 34 along the remainder of the second portion L of the anode lead wire 34. Further, the thickness D' of the anode lead wire 34 at notch 56 is less than the thickness D of the remainder of the anode lead wire 34. In FIG. 6, the stepped-shaped notch 56 results in a non-uniform thickness D' at the notch region N, and thus, D' as described in FIG. 6 refers to the smallest thickness of the anode lead wire 34 at the notch region N.

Figure 7:
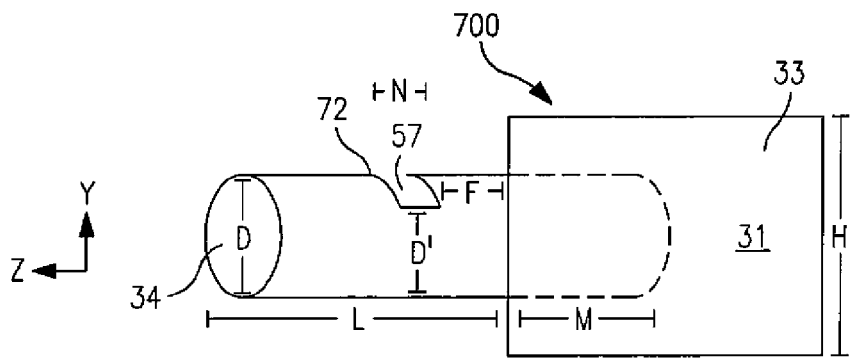
FIG. 7 is a side view of one embodiment of the electrolytic capacitor of the present invention.

While FIGS. 3-6 show various embodiments of a capacitor element where the notches are formed on X-axis facing surfaces of the anode lead wire, FIGS. 7-10 show various embodiments of a capacitor element where the notches are formed on Y-axis facing surfaces of the anode lead wire. Referring first to FIG. 7, a side view of a capacitor element 700 having an anode lead wire 34 is shown. A square-shaped notch 57 is formed at notch region N. The notch 57 is present on a Y-axis facing surface 72 of the anode lead wire 34. The notch is located at a distance F away from the porous anode body 33 along second portion L of the anode lead wire 34. Because of removal of material from the anode lead wire 34 to form the square-shaped notch 57, the material density of the anode lead wire 34 at the notch region N is less than the material density of the anode lead wire 34 along the remainder of the second portion L of the anode lead wire 34. Additionally, the thickness D' of the anode lead wire 34 at notch 57 is less than the thickness D of the remainder of the anode lead wire 34.

Figure 8:
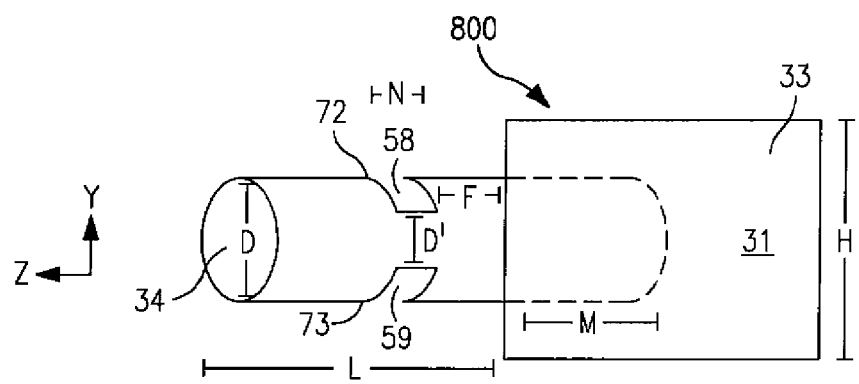
FIG. 8 is a side view of another embodiment of the electrolytic capacitor of the present invention.

Another embodiment of a side view of a capacitor element 800 is shown in FIG. 8. Two rectangular-shaped notches 58 and 59 are formed at notch region N. Notch 58 is present on a Y-axis facing surface 72 and notch 59 is present on an opposing Y-axis facing surface 73 of the anode lead wire 34 such that the anode lead wire is symmetrical at the notch region N. The notches are located at a distance F away from the porous anode body 33 along second portion L of the anode lead wire 34. Again, because of removal of material from the anode lead wire 34 to form the rectangular-shaped notches 58 and 59, the material density of the anode lead wire 34 at notch region N is less than the material density of the anode lead wire 34 along the remainder of the second portion L of the anode lead wire 34. Additionally, the thickness D' of the anode lead wire 34 at notches 58 and 59 is less than the thickness D of the remainder of the anode lead wire 34.

Figure 9:
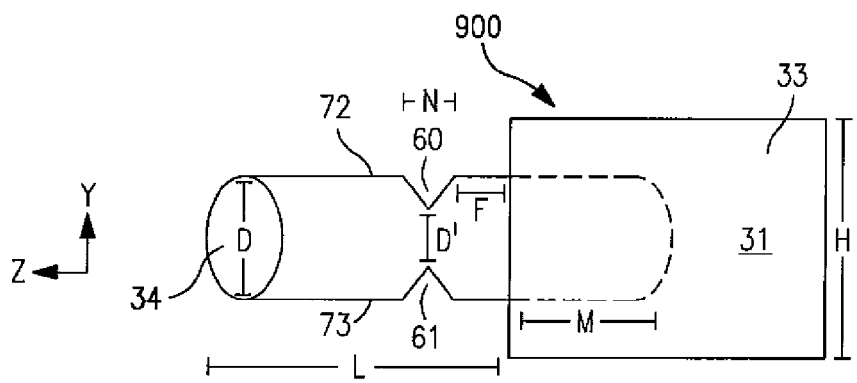
FIG. 9 is a side view of still another embodiment of the electrolytic capacitor of the present invention.

Yet another embodiment of a top view of a capacitor element 900 is shown in FIG. 9. Two triangular-shaped notches 60 and 61 are formed at notch region N. Notch 60 is present on a Y-axis facing surface 72 and notch 61 is present on an opposing Y-axis facing surface 73 of the anode lead wire 34 such that the anode lead wire is symmetrical at the notch region N. The notches are located at a distance F away from the porous anode body 33 along the second portion L of the anode lead wire 34. Once again, because of removal of material from the anode lead wire 34 to form the triangular-shaped notches 60 and 61, the material density of the anode lead wire 34 at the notch region N is less than the material density along the remainder of the second portion L of the anode lead wire 34. Further, the thickness D' of the anode lead wire 34 at notches 60 and 61 is less than the thickness D of the remainder of the anode lead wire 34. In FIG. 9, the triangular-shaped notches 60 and 61 result in a non-uniform thickness D' at the notch region N, and thus, D' as described in FIG. 9 refers to the smallest thickness of the anode lead wire 34 at the notch region N.

Figure 10:
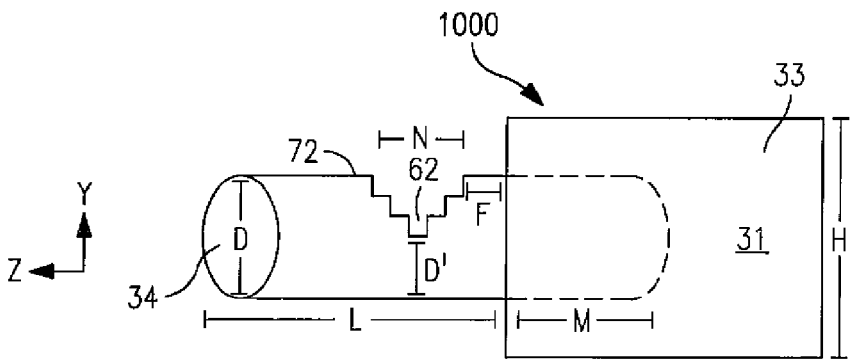
FIG. 10 is a side view of yet another embodiment of the electrolytic capacitor of the present invention.

Still another embodiment of a top view of a capacitor element 1000 is shown in FIG. 10. A stepped-shaped notch 62 is formed at notch region N. Notch 62 is present on a Y-axis facing surface 72 of the anode lead wire 34. The notch is located at a distance F away from the porous anode body 33 along second portion L. Once again, because of removal of material from the anode lead wire 34 to form the stepped-shaped notch 62, the material density of the anode lead wire 34 at the notch region N is less than the material density along the remainder of the second portion L of the anode lead wire 34. Further, the thickness D' of the anode lead wire 34 at notch 62 is less than the thickness D of the remainder of the anode lead wire 34. In FIG. 10, the stepped-shaped notch 62 results in a non-uniform thickness D' at the notch region N, and thus, D' as described in FIG. 10 refers to the smallest thickness of the anode lead wire 34 at the notch region N.

Turning now to the separate components of the capacitor element, the porous anode body 33 is typically formed from a valve metal composition having a high specific charge, such as about 5,000 $\mu F*V/g$ or more, in some embodiments about 10,000 $\mu F*V/g$ or more, in some embodiments about 20,000 $\mu F*V/g$ or more. As noted above, the lead assembly of the present invention can be particularly useful for "high specific charge" powders, which tend to shrink and pull away from the lead wires during sintering to a greater extent than lower specific charge powders. Such powders typically have a specific charge of from about 10,000 to about 600,000 $\mu F*V/g$, in some embodiments from about 40,000 to about 500,000 $\mu F*V/g$, in some embodiments from about 70,000 to about 400,000 $\mu F*V/g$, in some embodiments from about 100,000 to about 350,000 $\mu F*V/g$, and in some embodiments, from about 150,000 to about 300,000 $\mu F*V/g$. The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, the powder is compacted around the anode lead wire 34 so that at least a portion of the anode lead assembly extends from the compacted porous anode body 33. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the lead wire 34 may be embedded therein. The die may define a single or multiple slots that allow for the insertion of the wires. If more than one lead wire is employed, the lead wires can be placed in close proximity to each other in order to be sinter-bonded, although this is not required. After filling the die with powder and embedding the lead wires therein, the die cavity may then be closed and subjected to compressive forces by a punch. Typically, the compressive forces are exerted in a direction that is either generally parallel or generally perpendicular to the length of the anode lead wire, which extends along a longitudinal axis. This forces the particles into close contact with the wires and creates a strong wire-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body 33 is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

Once constructed, a dielectric layer may be formed by anodically oxidizing ("anodizing") the sintered anode body. This results in the formation of a dielectric layer that is formed over and/or within the pores of the anode body. For example, a tantalum (Ta) anode may be anodized to tantalum pentoxide ($Ta_2O_5$). Typically, anodization is performed by initially applying a solution to the anode, such as by dipping the anode into an electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The voltage applied during the dielectric layer formation process controls the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be performed at ambient temperature or lower. The resulting dielectric layer may be formed on a surface of the anode and within its pores.

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such layers are typically π-conjugated and have electrical conductivity after oxidation or reduction, such as an electrical conductivity of at least about 1 $\mu S\ cm^{-1}$ after oxidation. Examples of such π-conjugated conductive polymers include, for instance, polyheterocycles (e.g., polypyrroles, polythiophenes, polyanilines, etc), polyacetylenes, poly-p-phenylenes, polyphenolates, and so forth. Particularly suitable conductive polymers are substituted polythiophenes having the following general structure:

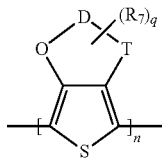

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

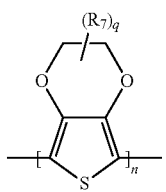

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

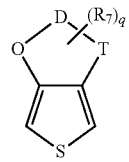

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

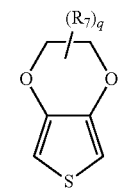

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctanic acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No5,473,503 to Sakata, et al., U.S. Pat. No5,729, 428 to Sakata, et al., and U.S. Pat. No5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

If desired, the capacitor may also contain other layers as is known in the art. For example, a protective coating may optionally be formed between the dielectric and solid electrolyte, such as one made of a relatively insulative resinous material (natural or synthetic). Such materials may have a specific resistivity of greater than about $10\Omega/cm$, in some embodiments greater than about 100, in some embodiments greater than about $1,000\Omega/cm$, in some embodiments greater than about $1\times10^5\Omega/cm$, and in some embodiments, greater than about $1\times10^{10}\Omega/cm$. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anode part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 to about 50 mΩ, and in some embodiments, from about 0.1 to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 µA/µF*V, in some embodiments less than about 0.01 µA/µF*V, and in some embodiments, less than about 0.001 µA/µF*V, wherein µA is microamps and uF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 23° C.±2° C. and at the rated voltage after a minimum of 30 seconds.

Laser Weld:

The laser weld was done using a Trumpf Nd:YaG HAAS laser (emitting near IR light at wavelength around 1,064 nanometers). The energy to weld generally refers to the amount of laser energy required to bond the anode lead wire to the anode termination/lead frame. The energy to weld is settled in Joules.

EXAMPLE 1

70,000 µFV/g tantalum powder was pressed into pellets to form porous bodies having a size of 1.80 mm (length), 2.40 mm (width) and 1.20 mm (thickness). The tantalum powder was charged into the hopper of a tantalum device automatic molding machine and automatically molded together with a 0.40 mm width/diameter (example 1) tantalum wire to manufacture a porous body. The penetration of the wire was 70% of the anode length. This molded body was left standing under reduced pressure at 1,300° C. to obtain a sintered body.

The porous sintered tantalum body was welded to an auxiliary stainless steel strip when the anode lead wire was notched during the loading process via a punching tool in the specific area important for bonding the lead wire to the lead frame. The reduced area had a 0.22 mm width/diameter.

The tantalum anode was anodized at 14 V in a liquid electrolyte of 0.1% phosphoric acid to make capacitors with 150 µF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based lead frame was used for finishing of the assembly process. The capacitor element was attached via a laser welding process to bond the anode lead wire to the anode termination. The energy used for cropping and welding the wire was settled to 8.6 Joules. Next, the lead frame was enclosed with encapsulating epoxy resin.

COMPARATIVE EXAMPLES 1A-1B

Capacitors were formed in the manner described in Example 1, except that an additional punching device was used for the wire notching. For the comparative examples, the tantalum powder was molded together with either a 0.17 mm width/diameter (example 1A) or a 0.40 mm width/diameter (example 1B) tantalum wire. Multiple parts (1250) were made in the manner described and then tested for electrical performance (i.e., ESR, and capacitance). Table 1 summarizes the tantalum wire diameters, laser weld setting and medians of capacitance and ESR of finished capacitors from example 1 as well as comparative examples 1A-1B.

TABLE 1

| | Ta wire diameter [mm] | Ta wire notched area diameter [mm] | Laser Weld Energy [J] | DCL [µA] | CAP [µF] | ESR [mΩ] |
|---|---|---|---|---|---|---|
| Example 1 | 0.40 | 0.22 | 8.6 | 2.63 | 138.3 | 36.8 |
| Comparative Example 1A | 0.17 | 0.17 | 6.0 | 1.47 | 145.2 | 45.1 |
| Comparative Example 1B | 0.40 | 0.40 | 26.0 | N/A | N/A | N/A |

EXAMPLE 2

70,000 µFV/g tantalum powder was pressed into pellets to form porous bodies having a size of 4.20 mm (length), 3.60 mm (width) and 0.95 mm (thickness). The tantalum powder was charged into the hopper of a tantalum device automatic molding machine and automatically molded together with a 0.50 mm width/diameter (example 2) tantalum wire to manufacture a porous body. The penetration of wire was 70% of the anode length. This molded body was left standing under reduced pressure at 1,300° C. to obtain a sintered body.

The porous sintered tantalum body was welded to auxiliary stainless steel strip. After that the anode lead wire was notched via sawing with diamond blade (Kulicke & Soffa precision saw). The thickness of diamond blade was 1.0 millimeters and the cut was done in the specific area important for bonding the lead wire to the lead frame. The reduced area had a 0.33 mm width/diameter.

The tantalum anode was anodized at 13 V in a liquid electrolyte of 0.1% phosphoric acid to make capacitors with 330 µF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based lead frame was used for finishing of the assembly process. The capacitor element was attached via a laser welding process to bond the anode lead wire to the anode termination. The energy used for cropping and welding the wire was settled to 16.0 Joules. Next, the lead frame was enclosed with encapsulating epoxy resin.

COMPARATIVE EXAMPLES 2A-2B

Capacitors were formed in the manner described in Example 2, except that an additional sawing device was used for the wire notching. For the comparative examples, the tantalum powder was molded together with a 0.24 mm width (example 2A) and a 0.50 mm width (example 2B) tantalum wire. Multiple parts (900) were made in the manner described and then tested for electrical performance (i.e., ESR, and capacitance). Table 2 summarizes the tantalum wire diameters, laser weld setting and medians of capacitance and ESR of finished capacitors from example 2 as well as comparative examples 2A-2B.

TABLE 2

| | Ta wire diameter [mm] | Ta wire notched area diameter [mm] | Laser Weld Energy [J] | DCL [µA] | CAP [µF] | ESR [mΩ] |
|---|---|---|---|---|---|---|
| Example 2 | 0.50 | 0.33 | 16.0 | 17.2 | 301.4 | 18.1 |
| Comparative Example 2A | 0.24 | 0.24 | 10.5 | 14.8 | 321.2 | 29.2 |
| Comparative Example 2B | 0.50 | 0.50 | 32.0 | N/A | N/A | N/A |

EXAMPLE 3

40,000 µFV/g tantalum powder was pressed into pellets to form porous bodies having a size of 5.20 mm (length), 3.70 mm (width) and 0.95 mm (thickness). The tantalum powder was charged into the hopper of a tantalum device automatic molding machine and automatically molded together with a 0.50 mm width (example 3) tantalum wire to manufacture a porous body. The penetration of wire was 70% of the anode length. This molded body was left standing under reduced pressure at 1,450° C. to obtain a sintered body.

The porous sintered tantalum body was welded to auxiliary stainless steel strip. After that the anode lead wire was notched via scanning laser (Trumpf TruMark laser). The working area was 1.0 millimeters, each single laser shot had a 0.2 millisecond duration and the energy was settled to 50 milliJoules. The erosion was done in the specific area important for bonding the lead wire to the lead frame. The reduced area had a 0.30 mm width/diameter.

The tantalum anode was anodized at 18 V in a liquid electrolyte of 0.1% phosphoric acid to make capacitors with 150 μF at 120 Hz. A conductive polymer coating was then formed by dipping the tantalum anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The parts were washed in methanol to remove reaction by-products, anodized in a liquid electrolyte, and washed again in methanol. The polymerization cycle was repeated 10 times. The finished parts were completed by conventional assembly technology and measured. A copper-based lead frame was used for finishing of the assembly process. The capacitor element was attached via a laser welding process required to bond the anode lead wire to the anode termination. The energy used for cropping and welding the wire was settled to 15.0 Joules. Next, the lead frame was enclosed with encapsulating epoxy resin.

COMPARATIVE EXAMPLES 3A-3B

Capacitors were formed in the manner described in Example 3, except that an additional laser device was used for the wire notching. For the comparative examples, the tantalum powder was molded together with a 0.19 mm width (example 3A) and a 0.50 mm width (example 3B) tantalum wire. Multiple parts (900) were made in the manner described and then tested for electrical performance (i.e., ESR, and capacitance). Table 3 summarizes the tantalum wire diameters, laser weld setting and medians of capacitance and ESR of finished capacitors from example 3 and compared with comparative examples 3A-3B.

TABLE 3

| | Ta wire diameter [mm] | Ta wire notched area diameter [mm] | Laser Weld Energy [J] | DCL [μA] | CAP [μF] | ESR [mΩ] |
|---|---|---|---|---|---|---|
| Example 3 | 0.50 | 0.30 | 15.0 | 12.4 | 144.3 | 11.2 |
| Comparative Example 3A | 0.19 | 0.19 | 8.2 | 4.5 | 152.6 | 21.4 |
| Comparative Example 3B | 0.50 | 0.50 | 32.0 | N/A | N/A | N/A |

As shown in the table 1, 2 and 3, the benefit of using a notched wire is for better ESR values and lower energy to weld when compared with the comparative examples having the same overall wire diameter. Electrical data for comparative examples B are not available due to impossibility of laser welding process (on the side of lead frame there is not much material for carrying out the welding process and all capacitors during following assembly process were open circuited).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:

a sintered, porous anode body having a width and a height;

an anode lead wire having a thickness that is at least about 10% of the height of the porous anode body, wherein the anode lead wire has a first portion positioned within the anode body and has a second portion extending from a surface of the anode body in a longitudinal direction, the second portion having a notched region, wherein the notched region includes a single indentation aligned perpendicular to the longitudinal direction in which the second portion of the anode lead extends, wherein the anode lead has a uniform thickness except at the indentation, wherein the notched region has a thickness that is from about 20% to about 90% of the thickness of the anode lead wire;

a dielectric layer overlying the sintered porous anode body;

a cathode overlying the dielectric layer that includes a solid electrolyte; and an anode termination having an upstanding portion and a planar portion, wherein the anode lead wire is welded to the upstanding portion of the anode termination at the indentation, wherein the upstanding portion is perpendicular to the longitudinal direction in which the anode lead wire extends.

2. The solid electrolytic capacitor of claim 1, wherein the thickness of the anode lead wire is from about 20 micrometers to about 3800 micrometers.

3. The solid electrolytic capacitor of claim 1, wherein the notched region is located a distance away from the surface of the anode body such that the ratio of the length of the second portion of the anode lead wire to the distance from the surface of the anode body to the location of the notched region is from about 1.1 to about 20.

4. The solid electrolytic capacitor of claim 1, wherein the indentation is formed by cutting, punching, or sawing the anode lead wire.

5. The solid electrolytic capacitor of claim 1, wherein the indentation is formed by a laser.

6. The solid electrolytic capacitor of claim 1, wherein the indentation is rectangular, square, circular, elliptical, triangular, stepped, U-shaped, or V-shaped.

7. The solid electrolytic capacitor of claim 1, wherein the anode body is formed from a powder having a specific charge of from about 10,000 μF*V/g to about 600,000 μF*V/g, wherein the powder comprises a valve metal, an electrically conductive oxide thereof, or an electrically conductive nitride thereof, wherein the valve metal includes tantalum, niobium, aluminum, hafnium, or titanium.

8. The solid electrolytic capacitor of claim 1, further comprising a cathode termination that is electrically connected to the cathode, and a molding material that encapsulates the capacitor element and leaves exposed at least a part of the anode termination and at least a part of the cathode termination.

9. The solid electrolytic capacitor of claim 1, wherein the anode lead wire is laser welded to the anode termination at the notched region.

10. A method for forming a solid electrolytic capacitor comprising a sintered, porous anode body having a width and a height, the method comprising:

positioning a first portion of an anode lead wire having a thickness that is at least about 10% of the height of the porous anode body within a powder formed from a valve metal composition such that a second portion of the anode lead wire extends from a surface of the anode body in a longitudinal direction;

compacting the powder around the first portion of the anode lead wire;

sintering the compacted powder and the first portion of the anode lead wire to form the porous anode body;

forming a notched region in the second portion of the anode lead wire, wherein the notched region includes a single indentation aligned perpendicular to the longitudinal direction in which the second portion of the anode lead extends, wherein the anode lead has a uniform thickness except at the indentation, wherein the notched region has a thickness that is from about 20% to about 90% of the thickness of the anode lead wire; and welding the anode lead wire to an anode termination at the indentation to form an electrical connection between the anode lead wire and the anode termination, wherein the anode termination has an upstanding portion and a planar portion, wherein the anode lead wire is welded to the upstanding portion of the anode termination, wherein the upstanding portion is perpendicular to the longitudinal direction in which the anode lead wire extends.

11. The method of claim 10, wherein the thickness of the anode lead wire is from about 20 micrometers to about 3800 micrometers.

12. The method of claim 10, wherein the indentation is formed by cutting, punching, or sawing.

13. The method of claim 10, wherein the indentation is formed by a laser.

14. The method of claim 10, wherein the anode lead wire is laser welded to the anode termination at the notched region to form an electrical connection between the anode lead wire and the anode termination.

15. The method of claim 10, wherein the indentation is formed by a laser and wherein the anode lead wire is sequentially laser welded to the anode termination at the notched region to form an electrical connection between the anode lead wire and the anode termination.

16. The method of claim 15, wherein the laser is used at a first energy level to form the indentation and is sequentially used at a second energy level to laser weld the anode lead wire to the anode termination.

17. The method of claim 10, wherein the indentation is rectangular, square, circular, elliptical, triangular, stepped, U-shaped, or V-shaped.

18. The method of claim 10, further comprising:

anodically oxidizing the sintered, porous anode body of claim 1 to form a dielectric layer; and applying a solid electrolyte to the anodically oxidized sintered anode body to form a cathode.

19. The method of claim 18, further comprising:

forming an electrical connection between the cathode and a cathode termination; and encapsulating the capacitor with a molding material such that at least a part of the anode termination and a part of the cathode termination are left exposed.

* * * * *